E. G. WATROUS.
LAVATORY.
APPLICATION FILED OCT. 2, 1905.

951,161.

Patented Mar. 8, 1910.
2 SHEETS—SHEET 1.

Witnesses:
Edward Barritt
Lutie S. Aker

Inventor:
Earl G. Watrous
By Rector & Hibben
his Attorneys

E. G. WATROUS.
LAVATORY.
APPLICATION FILED OCT. 2, 1905.
951,161.
Patented Mar. 8, 1910.
2 SHEETS—SHEET 2.
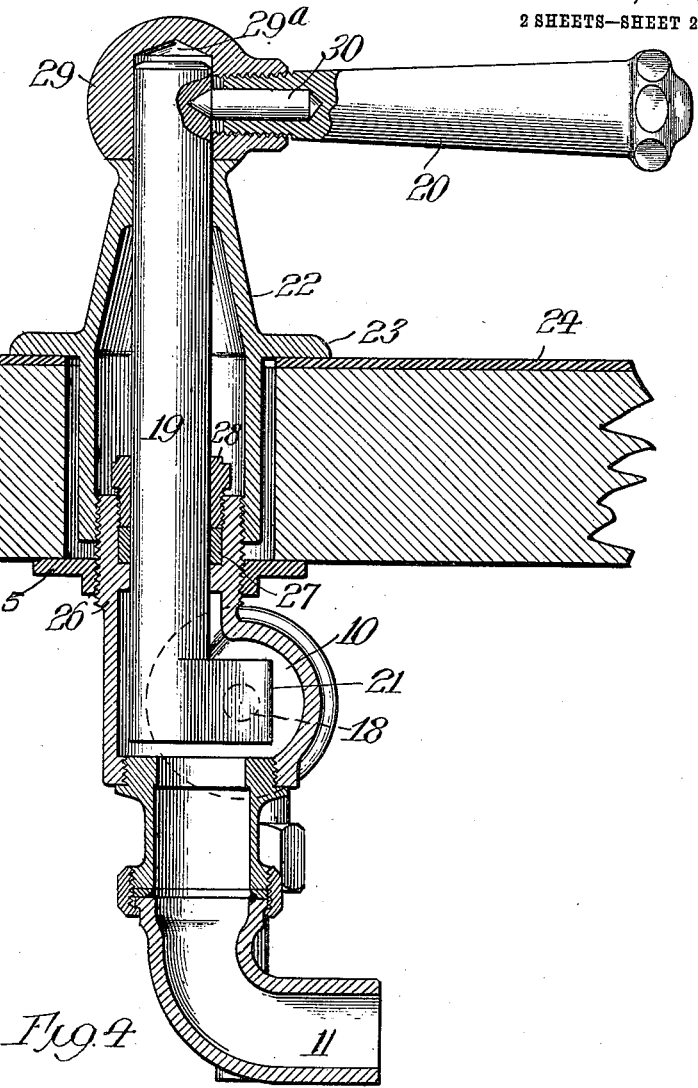
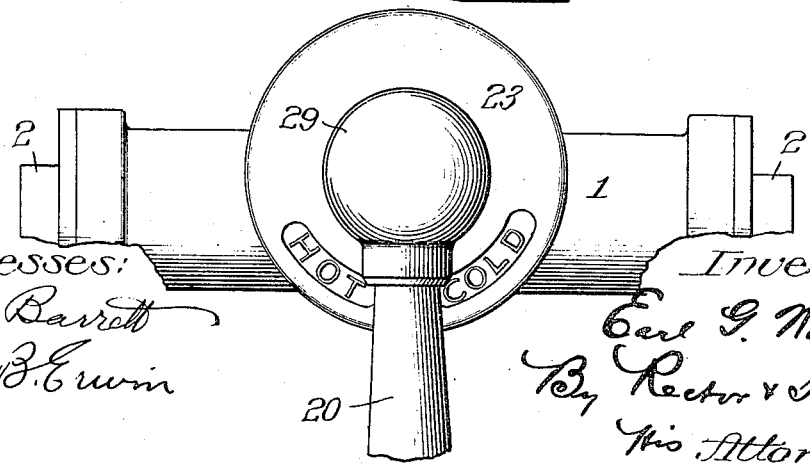
Witnesses:
Edw. Barrett
Louis B. Erwin
Inventor:
Earl G. Watrous
By Rector & Hibben
His Attorneys.

UNITED STATES PATENT OFFICE.

EARL G. WATROUS, OF CHICAGO, ILLINOIS.

LAVATORY.

951,161.  Specification of Letters Patent.  Patented Mar. 8, 1910.

Application filed October 2, 1905. Serial No. 280,981.

*To all whom it may concern:*

Be it known that I, EARL G. WATROUS, a citizen of the United States, residing at Chicago, Cook county, Illinois, have invented certain new and useful Improvements in Lavatories, of which the following is a specification.

My invention relates to lavatories and the like and the object thereof is to provide a simple, efficient and reliable construction of fixture, more particularly designed for basins, having hot and cold water connections which are governed by valves controlled by a single operating handle.

The features of advantage of my novel construction of fixture will be apparent from the description hereinafter given.

Figure 1:
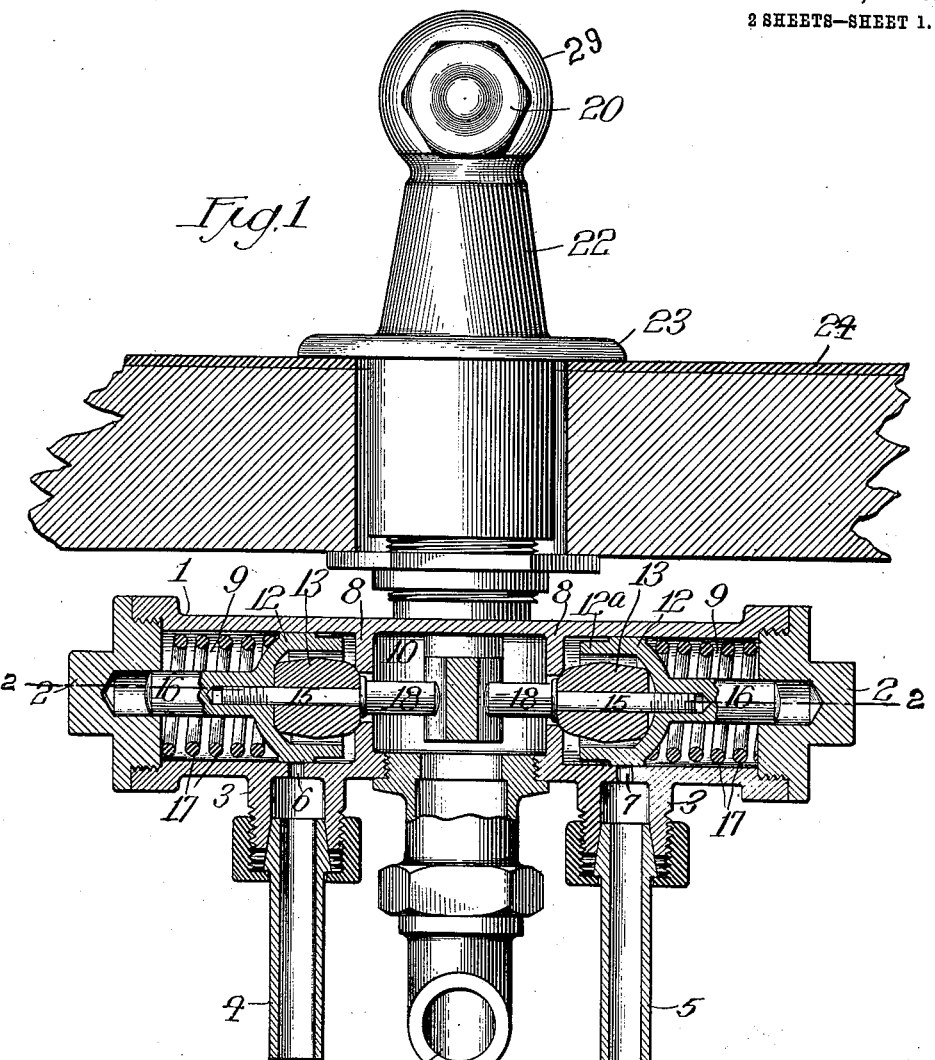
Figure 2:
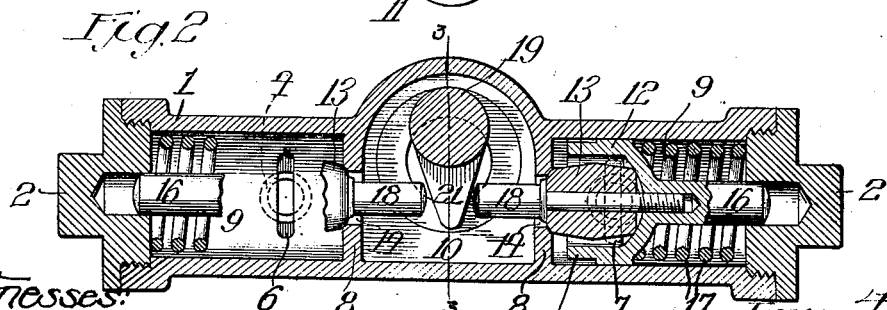

In the drawings Figure 1 is a sectional elevation of my improved fixture; Fig. 2 a cross section on line 2—2 of Fig. 1; Fig. 3 a sectional elevation on line 3—3 of Fig. 2; and Fig. 4 a plan view of the fixture.

The fixture comprises essentially a casing connected to the hot and cold water supply and containing the valves which are operated by a handle common to both valves. As herein shown, the valve casing 1 is cylindrical and positioned horizontally with its ends closed by screw plugs 2. The casing has on either side of its middle a depending nozzle 3 connected with the hot and cold water connections 4 and 5 and communicating with the interior of the valve casing (when permitted by the valves therein) through the inlet ports 6 and 7 respectively, which ports are preferably in the form of slots as indicated in Fig. 2.

The valve casing is divided by the two vertical partitions 8 into three chambers, the end ones 9 being admission chambers communicating with the hot and cold water respectively, and the other or intermediate one 10, being an outlet chamber communicating with an outlet pipe or connection 11 leading from such valve casing to the bowl or basin, or other place. Within each chamber 9 is located similar valve mechanism comprising a cup-shaped piston 12 containing a Fuller ball 13 and arranged to travel in the chamber and over the inlet port in the manner of a slide valve. The inner end 12ª of each piston is reduced in diameter with the result that when the piston travels outwardly sufficiently to uncover its inlet port the water admitted therethrough will be retarded while such reduced portion of the piston is intermediate the inlet port and will be deflected inwardly toward the outlet chamber. By thus providing the piston with the reduced portion 12ª there is formed between such portion and the inner wall of the casing or valve chamber a restricted annular space for the passage of the water from such chamber and through the outlet, with the result that dirt, cinders and other foreign matter are prevented from passing beyond the inlet ports and from entering the valve chamber and prevented from eventually becoming embedded in the rubber ball valve 13 which would interfere with the proper seating of the same. This construction is of advantage in this type of basin fixture inasmuch as it is more particularly designed for use in sleeping cars, where the supply of water is liable to contain cinders and other foreign substances which would be liable to interfere with the proper seating of the valves, especially the rubber valves referred to. This restricted space or passage for the water permits the water to properly flow but holds back the cinders and the like in the supply pipe and prevents them from entering the valve chamber.

The Fuller balls are adapted to control the ports 14 through the partitions 8 and to thereby govern the supply of water to the outlet chamber 10. Each ball is secured to the piston or valve body in suitable manner as by means of the pin 15 passing therethrough and screw-threaded into the outwardly projecting piston stem 16 which is guided in the screw plug 2. Each ball or valve is normally seated by a coiled spring 17 within chamber 9. The pins 15 are extended inwardly to constitute valve actuating heads or stems 18 which pass through the ports 14 and into the outlet chamber 10 and approach each other.

As hereinbefore stated, the valves are designed to be operated by a common operating handle whose movement in one direction opens one valve and in the other direction opens the other valve. To this end the operating stem 19 having a handle 20 at its upper end is provided at the lower end with a laterally projecting lug 21 which is positioned between the valve operating stems 18 to operate either one or the other thereof accordingly as the operating stem and handle are turned in the one direction or the other.

The operating stem 19 and associated parts are constructed and arranged in the following novel manner. The operating stem bears in a hollow bearing support 22 and extends centrally therethrough. This support or casing 22 has a flange 23 intermediate its length adapted to rest upon or against the bowl or basin 24 and to be clamped thereto through the medium of the clamping nut 25 screwing onto the upwardly projecting nozzle or connection 26 extending from the valve casing 1. This nozzle 26 screws into the lower end of the support or casing 22, with the result that the parts described are all connected together and clamped to the casing. The stem 19 is packed by the packing 27 held in place and expanded by the packing nut 28.

Heretofore much difficulty has been experienced in devices of the general character in question, in suitably and efficiently connecting the handle and stem and to overcome the difficulty and provide a structure which is at once simple as well as efficient, I have constructed and arranged the parts as shown in Fig. 3. As indicated, the handle 20 is screw-threaded at its inner end so as to screw into the head 29 which has a socket 29$^a$ to receive the upper end of the operating stem 19 and bears against the upper end of the casing 22. The inner end of the handle has a central bore in which is inserted a pin 30 whose inner end, projecting beyond such end of the handle, is conical and arranged to fit into a corresponding hole or recess in one side of the operating stem or rod when the handle is screwed in place.

It will be understood that when the handle is turned in one direction, say to the left (Fig. 1) the left hand valve or ball is operated and its piston slid against the spring tension to uncover the inlet port 6 through which the water flows from the supply connection 4, and into the chamber 10, thence to the outlet 11 to the bowl or other place of use. The flow is retarded and deflected by the inner reduced end 12$^a$ of the piston when the valve is first opened but after the piston clears the port the flow is full and unimpeded. When the handle is released, the spring returns the piston and ball, the flow being cut off gradually by means of said reduced end of the piston. The right hand valve is operated in similar manner by turning the handle to the right. The flange 23 may be provided with the proper marks "Hot" and "Cold" to indicate which way to turn the handle to secure either hot or cold water.

The described construction provides a fixture which is not only reliable and efficient in operation, but also durable and capable of being readily put in place and assembled.

I claim:

1. A basin fixture for hot and cold water comprising a valve casing having ports connecting respectively with hot and cold water supplies and having an outlet, valve mechanism governing at two points the flow of water from each port to the outlet and arranged to deflect the flow at one of said points and to cause the water to pass through a restricted space, and means for operating the valve mechanism; substantially as described.

2. A basin fixture comprising a valve casing having a chamber communicating with the water connection or inlet and having an outlet and a valve operating in said chamber for controlling said inlet and outlet and consisting of a piston having a portion adapted to seat on the inlet to close the same and arranged to travel in said chamber, said piston having a reduced portion 12$^a$ whereby a restricted passage is provided for the flow of water between the piston and the inner wall of the chamber to thereby prevent the passage of foreign substances beyond the inlet port; substantially as described.

3. A basin fixture for hot and cold water comprising a valve casing having two partitions dividing the same into the two end inlet chambers and middle outlet chamber 10 and provided with ports 14, each of said end chambers having a port arranged to communicate with a source of water supply, valve mechanism in each chamber for governing its ports, each valve mechanism comprising a hollow piston 12 movable in its chamber 9 to govern its water supply port and a Fuller ball arranged within said piston to govern its port 14, said piston having a reduced portion 12$^a$ to provide a restricted space for the flow of water, a stem or head 18 projecting from the ball inwardly through port 14 and into outlet chamber 10, and means for actuating said head and thereby operating the valve; substantially as described.

EARL G. WATROUS.

Witnesses:
S. E. HIBBEN,
LOUIS B. ERWIN.